United States Patent
Brown et al.

(10) Patent No.: US 10,386,884 B1
(45) Date of Patent: Aug. 20, 2019

(54) HIGHLY MANEUVERABLE VEHICLE WITH MECANUM WHEELS

(71) Applicant: Hydro-Gear Limited Partnership, Sullivan, IL (US)

(72) Inventors: Alyn Brown, Indianapolis, IN (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 15/864,847

(22) Filed: Jan. 8, 2018

Related U.S. Application Data (63) Continuation of application No. 14/819,034, filed on Aug. 5, 2015, now Pat. No. 9,864,396.

(60) Provisional application No. 62/033,479, filed on Aug. 5, 2014.

(51) Int. Cl.
   G05G 9/047 (2006.01)
   A01D 34/00 (2006.01)
   B62D 6/08 (2006.01)

(52) U.S. Cl.
   CPC .......... *G05G 9/047* (2013.01); *A01D 34/006* (2013.01); *B62D 6/08* (2013.01)

(58) Field of Classification Search
   CPC .... B62D 5/0418; B62D 7/026; B62D 7/1509; B62D 11/04; B62D 57/024; B62D 7/023; B62D 11/001; B62D 51/02; B62D 6/08; G05D 2201/0208; G05D 9/047; A01D 34/008; A01D 34/066
   See application file for complete search history.

(56) References Cited

U.S. PATENT DOCUMENTS

| | | | |
|---|---|---|---|
| 4,655,670 A | 4/1987 | Hogberg et al. | |
| 4,811,227 A | 3/1989 | Wikstrom | |
| 5,418,437 A * | 5/1995 | Couture | B60L 11/123 318/139 |

(Continued)

FOREIGN PATENT DOCUMENTS

| | | |
|---|---|---|
| CN | 104144845 | 11/2014 |
| CN | 104982147 | 10/2015 |

(Continued)

OTHER PUBLICATIONS

Baker, et al., "Omnidirectional Drive Systems Kinematics and Control," 2008 First Robotics Conference, 41 pp.

(Continued)

*Primary Examiner* — Arpad Fabian-Kovacs
(74) *Attorney, Agent, or Firm* — Neal, Gerber & Eisenberg LLP (57) ABSTRACT

Highly maneuverable utility vehicles having Mecanum wheels capable of traveling in a variety of different directions and turning in a zero turn manner. Such a vehicle may include one or more controllers in communication with drive units for powering the Mecanum wheels. A multi-axis interface, such as a joystick, may be connected to the controller for proportionally controlling the direction and speed of the vehicle, and for providing different manners in which the vehicle may enter zero-turn mode. The joystick may include at least one pushbutton for switching between programmed travel modes or selecting an auxiliary function. The controller may be programmed to permit the vehicle to operate in different operating modes.

20 Claims, 12 Drawing Sheets

(56) References Cited

U.S. PATENT DOCUMENTS

| | | | | |
|---|---|---|---|---|
| 6,185,920 | B1* | 2/2001 | Oxley | B62D 51/008 56/14.7 |
| 6,688,412 | B2* | 2/2004 | Kima | B60K 17/046 180/65.1 |
| 6,761,234 | B1* | 7/2004 | Lamela | B62D 7/142 180/6.3 |
| 7,416,040 | B2* | 8/2008 | Dvorak | A01B 51/02 180/167 |
| 8,738,226 | B2* | 5/2014 | Troy | B25J 5/007 701/1 |
| 2003/0085680 | A1* | 5/2003 | Wakitani | B60L 3/0023 318/432 |
| 2004/0263099 | A1* | 12/2004 | Maslov | B60L 11/126 318/400.24 |
| 2005/0052080 | A1* | 3/2005 | Maslov | B60L 8/00 307/10.1 |
| 2005/0108997 | A1* | 5/2005 | Hunt | A01D 34/008 56/6 |
| 2005/0108998 | A1* | 5/2005 | Hunt | A01D 34/008 56/6 |
| 2005/0183896 | A1 | 8/2005 | Fenelli et al. | |
| 2007/0256868 | A1* | 11/2007 | Romig | A01D 34/008 180/6.5 |
| 2010/0307843 | A1* | 12/2010 | Lawson, Jr. | B60K 17/356 180/6.48 |
| 2010/0326030 | A1* | 12/2010 | Bernini | A01D 34/008 56/10.2 A |
| 2013/0140801 | A1* | 6/2013 | Schlee | B60B 39/00 280/762 |

FOREIGN PATENT DOCUMENTS

| | | | | |
|---|---|---|---|---|
| CN | 205658063 | | 10/2016 | |
| CN | 205658063 | U * | 10/2016 | A01H 3/08 |
| CN | 108422102 | A * | 8/2018 | B23K 26/38 |

OTHER PUBLICATIONS

Needel, "Mecanum Lawnmower"?," Robogreg.com, Jun. 4, 2009, 2pp.
Robotnik Informational Sheet, Summit XL Omni, Feb. 2014, 2 pp.
Nexus Robot, Looking to the future, Robot Kits Manual, Nexus Automation Limited, Date unknown but believed to be before Aug. 4, 2015, 128 pp.

* cited by examiner

FIG. 16

HIGHLY MANEUVERABLE VEHICLE WITH MECANUM WHEELS

CROSS-REFERENCE

This application is a continuation of U.S. patent application Ser. No. 14/819,034, filed on Aug. 5, 2015, which claims the benefit of U.S. Provisional Patent App. No. 62/033,479, filed on Aug. 5, 2014. The disclosures of these prior applications are incorporated herein by reference in their entirety.

BACKGROUND OF THE INVENTION

This disclosure is generally related to drive and directional control systems for vehicles, and more particularly to drive and directional control systems and devices for utility vehicles having Mecanum wheels, such as lawn and garden tractors or mowers.

Traditional vehicle maneuverability, such as that of a garden tractor equipped with a hydrostatic transmission and an internal combustion engine, is accomplished by a combination of driven wheels powered by a single transmission, a transmission control, steered wheels, a steering control, and a throttle. The operator of such a vehicle, after startup, first sets the engine speed with the throttle. Next, the operator displaces the transmission control, such as a hand or foot control, to select a forward or reverse direction of travel and also the speed of travel. Simultaneously, the operator steers the vehicle, typically with a steering wheel and mechanical linkage to the steered wheels. This type of vehicle and control may result in limited maneuverability, e.g., a wide turning radius that limits the ability of the vehicle to travel in tight quarters.

In an attempt to improve maneuverability, zero turn vehicles, such as zero turn mowers, were introduced. One type of zero turn vehicle uses independently controlled transaxles to provide steering by selectively speeding up, slowing down, or changing the direction of rotation of the driven wheels on each side of the vehicle. Typically, an operator has a pair of levers that independently control the speed and rotational direction of the output of a transaxle on each side of the vehicle, and thus the speed and rotational direction of the associated driven wheel. If an operator wishes to move the vehicle forward, he presses both levers forward. If the operator wishes to move the vehicle backwards, he pulls both levers back. To steer the vehicle to the left, the right side lever is pushed further than the left, and to execute a very tight turn to the left, the operator can pull the left lever back while pressing the right lever forward to execute a zero radius, or near zero radius turn. Traditionally, zero turn mowers do not have steered wheels per se, but rather a pair of caster wheels at the front of the vehicle which respond to the actions of the driven rear wheels. Zero turn mowers with steering wheels are also available, but they generally have complex mechanical linkages to coordinate the movements of a pair of steered front wheels with the outputs of the driven rear wheels.

An alternate steering input device, such as a joystick and associated controller, may be used to control the outputs of the independent transmissions of a zero turn vehicle. Comparatively speaking, the steering wheel system is easy to operate but may lack the maneuverability and programming flexibility of a joystick control system, and the lever activated differential steering systems may simply be more difficult to use for some vehicle operators.

The wheels on vehicles may include various types of tires, casters, and the like. One particular type of wheel is a Mecanum wheel that has a series of angled rollers attached to the outer circumference of the wheel. Vehicles equipped with Mecanum wheels are omnidirectional in that they can move in any direction by varying the speed and direction of rotation of each of the Mecanum wheels in a coordinated manner. For example, a vehicle with Mecanum wheels can move forward or backward by driving its wheels in the same direction, can rotate in place (zero turn) by driving the wheels on one side of the vehicle in the opposite direction as the wheels on the other side of the vehicle, and can additionally move sideways by driving the wheels on one diagonal of the vehicle in the opposite direction as the wheels on the other diagonal. This disclosure is directed to addressing the problems and needs of drive and steering systems related to highly maneuverable utility vehicles having Mecanum wheels.

SUMMARY OF THE INVENTION

The present invention comprises a control system for a utility vehicle having Mecanum wheels that is capable of traveling in a variety of different directions and turning in a zero turn manner. The control system incorporates a multi-axis user interface such as a joystick connected to a controller for proportionally controlling the direction and speed of the vehicle, and for providing different manners in which the vehicle may enter zero-turn mode. The joystick may include at least one pushbutton for switching between programmed travel modes or selecting an auxiliary function.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 1:
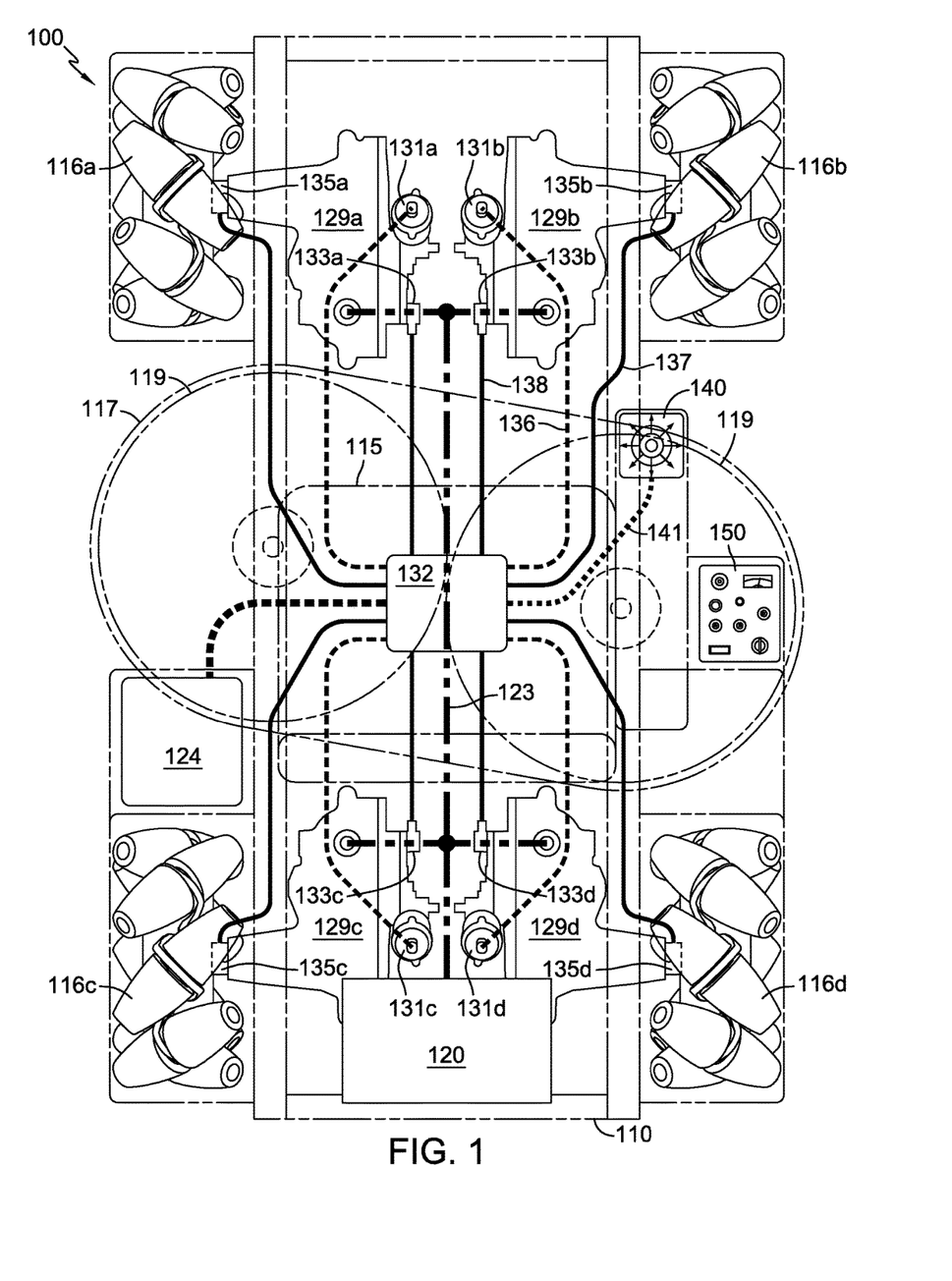
FIG. 1 is a top plan view of a first exemplary vehicle incorporating the control system as disclosed herein.

FIGS. 1-7 represent various exemplary vehicles having Mecanum wheels in which the present invention could be used. FIG. 1 depicts an exemplary zero turn vehicle 100 having a first pair of hydrostatic transaxles 129a, 129b driving front Mecanum wheels 116a, 116b, respectively, and a second pair of hydrostatic transaxles 129c, 129d driving rear Mecanum wheels 116c, 116d, respectively. Prime mover 120 disposed on frame 110 drives the transaxles 129a-d by means of a standard belt and pulley or other known drive system 123. Prime mover 120 can have an output shaft and be an internal combustion engine, electric motor, hybrid power plant (e.g., an alternator or generator driven by an internal combustion engine), or the like. The Mecanum wheels 116a-d allow zero turn rotation of the vehicle 100. Other standard elements, such as operator seat 115, deck 117, and blades 119, are depicted in a representational manner, as the specifics of these features are not critical to the present disclosure.

Controller 132 is depicted as being centrally located under seat 115, but the location and form of this component and others, such as battery 124, can be modified and are dependent on the vehicle size, expected duty cycle, and other factors. A control panel 150 provides the operator with certain operator controls, such as a vehicle start switch, and information about the status of vehicle 100. Controller 132 is connected to joystick 140 by means of conductor 141, and is powered by battery 124. In an embodiment, controller 132 may include a signal processor, program storage, and multiple motor controllers. As is known in the art, the signal processor, program storage, and motor controllers can be enclosed in separate housings and may include additional components for power control. The joystick 140 and the function of the underlying control system may be similar in some respects to those disclosed in U.S. patent application Ser. No. 14/790,675, now U.S. Pat. No. 9,725,114, the terms of which are incorporated herein by reference.

Electric displacement actuators 131a-d control the output of transaxles 129a-d, respectively, based on input from controller 132, and are connected thereto by means of conductors 136. Sensors 133a-d also provide controller 132 with information about the position of the swash plates (hydraulic displacement control components for the axial piston pumps of transaxles 129a-d, not shown) inside transaxles 129a-d by means of conductors 138. It should be noted that transaxles 129a-d, though described as hydraulic, are merely exemplary variable drive units having a control shaft that can be adjusted by electric displacement actuators 131a-d. The variable drive units could be continuously variable transmissions (CVT), toroidal, friction drives, or the like powered by prime mover 120. Speed sensors 135a-d are used to indicate the actual speed of driven Mecanum wheels 116a-d, and are connected to controller 132 by means of conductors 137. Electric displacement actuators 131a-d may be similar to those depicted in U.S. patent application Ser. No. 14/104,979, now U.S. Pat. No. 9,114,798, the terms of which are incorporated herein by reference. Transaxles 129a-d may be Hydro-Gear ZT-2800 integrated zero-turn transaxles, as depicted in U.S. Pat. No. 7,134,276, the terms of which are incorporated herein by reference. Electric displacement actuators 131a-d are shown as being integral to transaxles 129a-d but they could also be separately connected thereto.

Additional types of utility vehicles 200, 300, 400, 500, 600, and 700 are depicted in FIGS. 2, 3, 4, 5, 6, and 7, respectively, and are described below. Many aspects of these vehicles 200, 300, 400, 500, 600, and 700 are similar to those in vehicle 100, such as frame 210, 310, 410, 510, 610, 710; Mecanum wheels 216a-d, 316a-d, 416a-d, 516a-d, 616a-d, and 716a-d; and the like, and these elements may be depicted in the figures but will not be discussed in any detail, as the structure and operation of such elements can be substantially similar between embodiments. Joystick 140, which is described in more detail below, is depicted as being the same in each of the vehicle embodiments.

Figure 2:
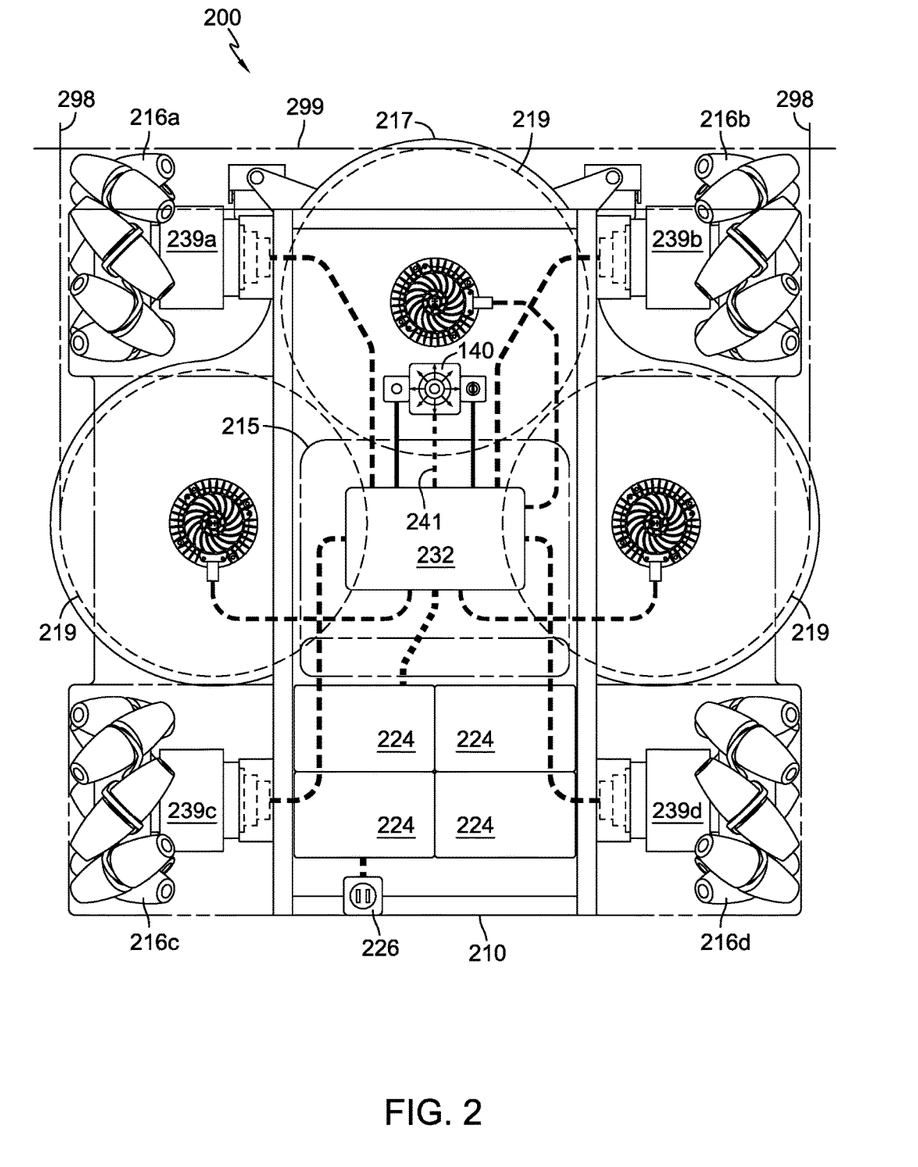
FIG. 2 is a top plan view of a second exemplary vehicle incorporating the control system as disclosed herein.

FIG. 2 depicts an exemplary all-electric zero turn vehicle 200 incorporating wheel hub motors 239a-d on which the Mecanum wheels 216a-d, respectively, are mounted. Vehicle 200 is similar in many respects to vehicle 100, with similarly numbered elements being similar to those previously discussed. The primary difference in vehicle 200 is the use of batteries 224 to power electric wheel hub motors 239a-d and mower blades 219 without the need for a separate engine. Multiple batteries 224 are shown mounted in the vehicle 200, although different numbers of batteries may be used, depending on the desired power requirements and operating characteristics of the vehicle. A charge receptacle 226 is provided. Joystick 140 is connected to controller 232, and controller 232 is connected to each of the separate wheel hub motors 239a-d. The wheel hub motors 239a-d drive Mecanum wheels 216a-d. The flexibility of this design can be seen as the longitudinal cutting paths 298 of the side blades 219 extend beyond the sides of the four Mecanum wheels 216a-d and the lateral cutting path 299 of the front blade 219 extends beyond the front Mecanum wheels 216a, 216b, to increase the size of the cutting area when vehicle 200 is moving in the forward, reverse, or lateral directions.

Figure 3:
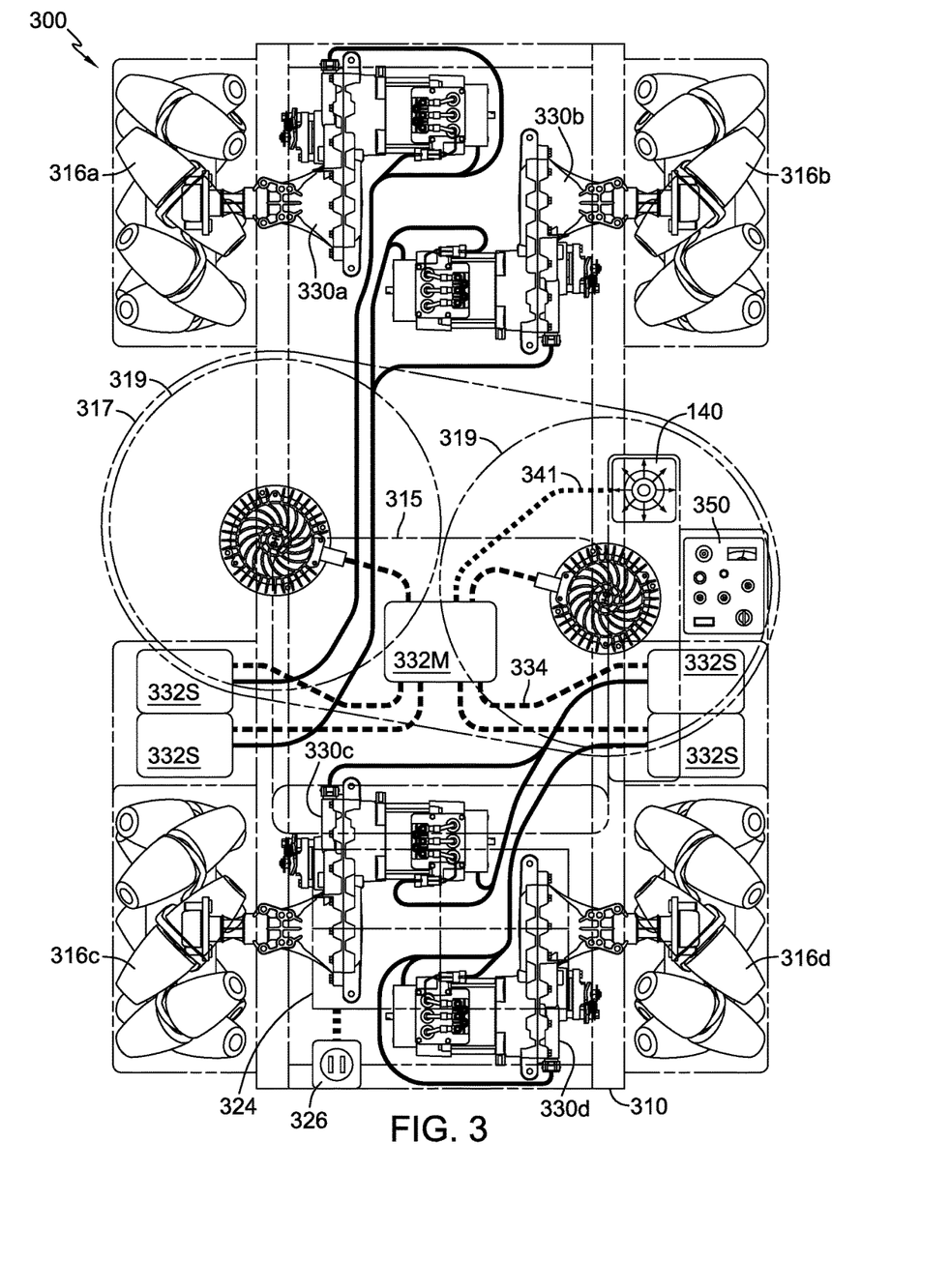
FIG. 3 is a top plan view of a third exemplary vehicle incorporating the control system as disclosed herein.

FIG. 3 depicts another exemplary all-electric zero turn vehicle 300 which is similar to vehicle 100, with the primary differences being the use of master and slave controllers 332M, 332S, and electric transaxles 330a-d in lieu of hydrostatic transaxles or electric wheel hub motors. The electric transaxles 330a-d drive Mecanum wheels 316a-d, and are controlled by controllers 332M, 332S. Battery 324 is depicted for powering electric transaxles 330a-d and a charge receptacle 326 is also provided. Bus 334 connects master controller 332M to slave controllers 332S, and master controller 332M is connected to joystick 140 by means of conductor 341. In the embodiment shown in FIG. 3, each of the electric transaxles 330a-d is connected to and controlled by a respective slave controller 332S. It will be understood that joystick 140 could also be wirelessly connected to master controller 332M by known technology and that controllers 332M and 332S could be combined into a single controller. Multiple slave controllers 332S are depicted, although a single slave controller having a signal processor and multiple motor controllers may also be utilized. The electric transaxles 330a-d depicted herein may be similar in construction to those depicted in U.S. Pat. No. 8,668,036, the terms of which are incorporated herein by reference.

Figure 4:
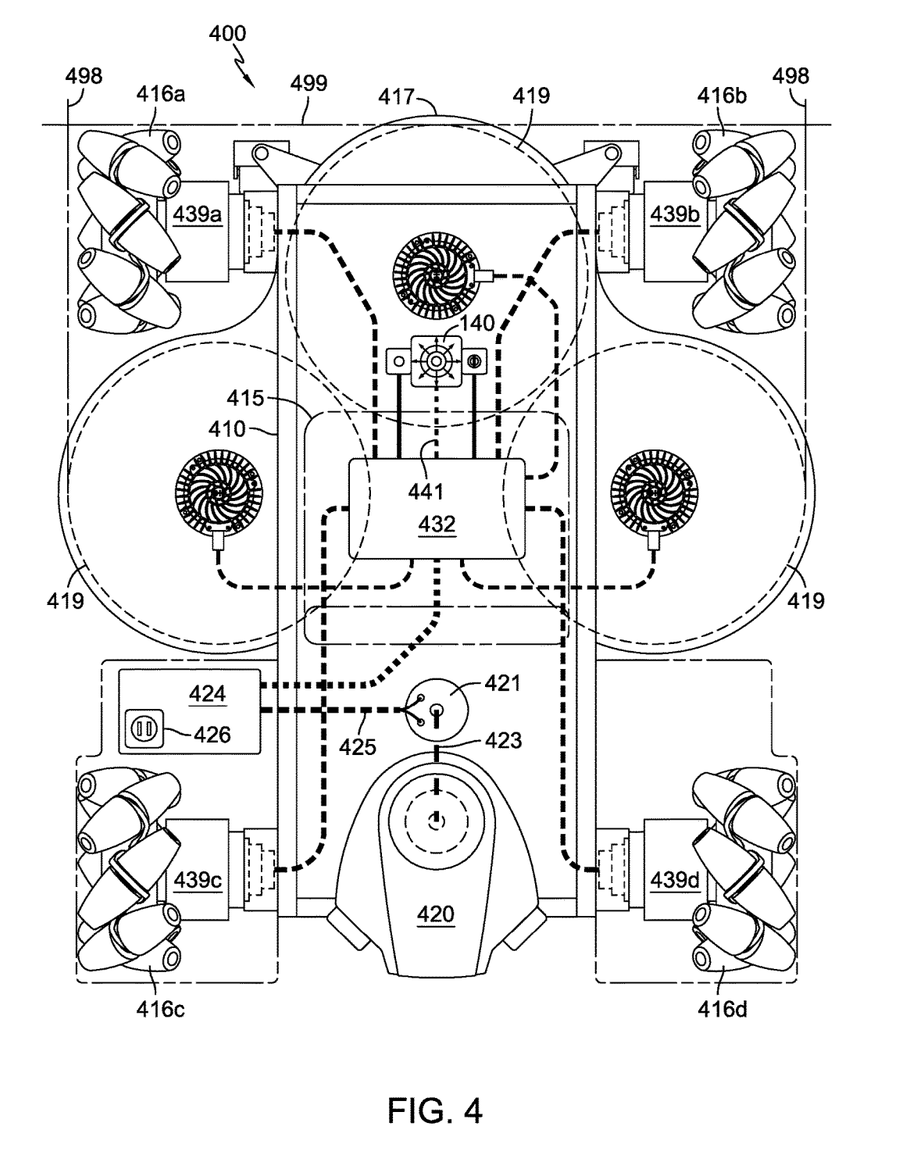
FIG. 4 is a top plan view of a fourth exemplary vehicle incorporating the control system as disclosed herein.

FIG. 4 depicts an exemplary hybrid zero turn vehicle 400 having wheel hub motors 439a-d on which the Mecanum wheels 416a-d, respectively, are mounted. Vehicle 400 is similar to vehicle 200, except that vehicle 400 has a prime mover 420, such as an internal combustion engine, disposed on frame 410. Prime mover 420 powers alternator 421 through a standard belt and pulley or other known drive system 423. Alternator 421 in turn charges the battery 424 through conductor 425. Although alternator 421 is depicted as a single high output unit, alternator 421, as illustrated, is merely exemplary and can represent multiple alternators driven by prime mover 420 depending on the power requirements of vehicle 400. A charge receptacle 426 is also provided. Joystick 140 is connected to controller 432 through conductor 441, and controller 432 is connected to each of the separate wheel hub motors 439a-d. Similar to vehicle 200, the longitudinal and lateral cutting paths 498, 499 of blades 419 on vehicle 400 extend beyond the front Mecanum wheels 416a, 416b.

Figure 5:
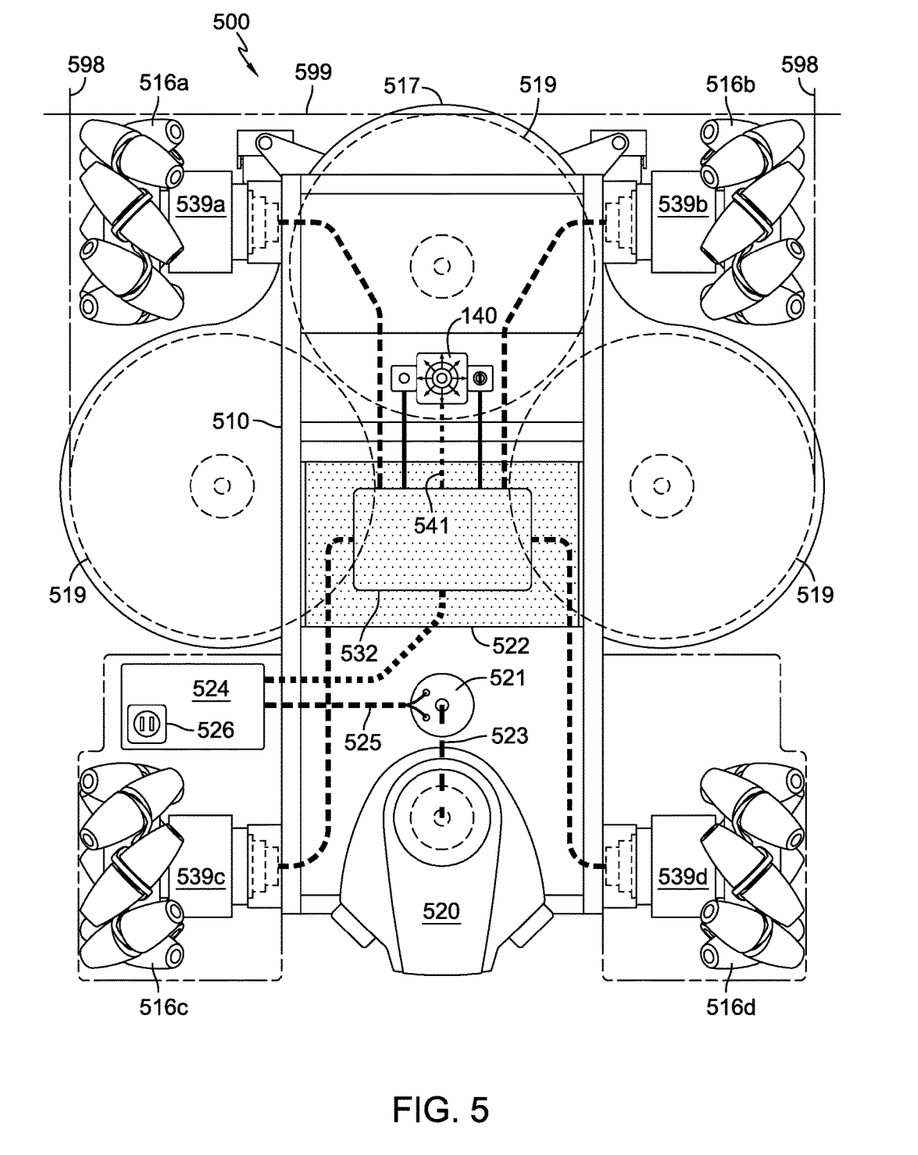
FIG. 5 is a top plan view of a fifth exemplary vehicle incorporating the control system as disclosed herein.

FIG. 5 depicts an exemplary hybrid zero turn vehicle 500 that is a stand-on vehicle. Vehicle 500 is similar to vehicle 400 in that Mecanum wheels 516a-d are mounted on wheel hub motors 539a-d, and prime mover 520 powers alternator 521 to charge battery 524 through conductor 525. However, an operator of vehicle 500 can stand on platform 522 instead of sitting in a seat. The platform 522 in FIG. 5 is disposed approximately in the center of vehicle 500 to promote operator stability. Similar to vehicles 200, 400, the longitudinal and lateral cutting paths 598, 599 of blades 519 on vehicle 500 extend beyond the front Mecanum wheels 516a, 516b.

Figure 6:
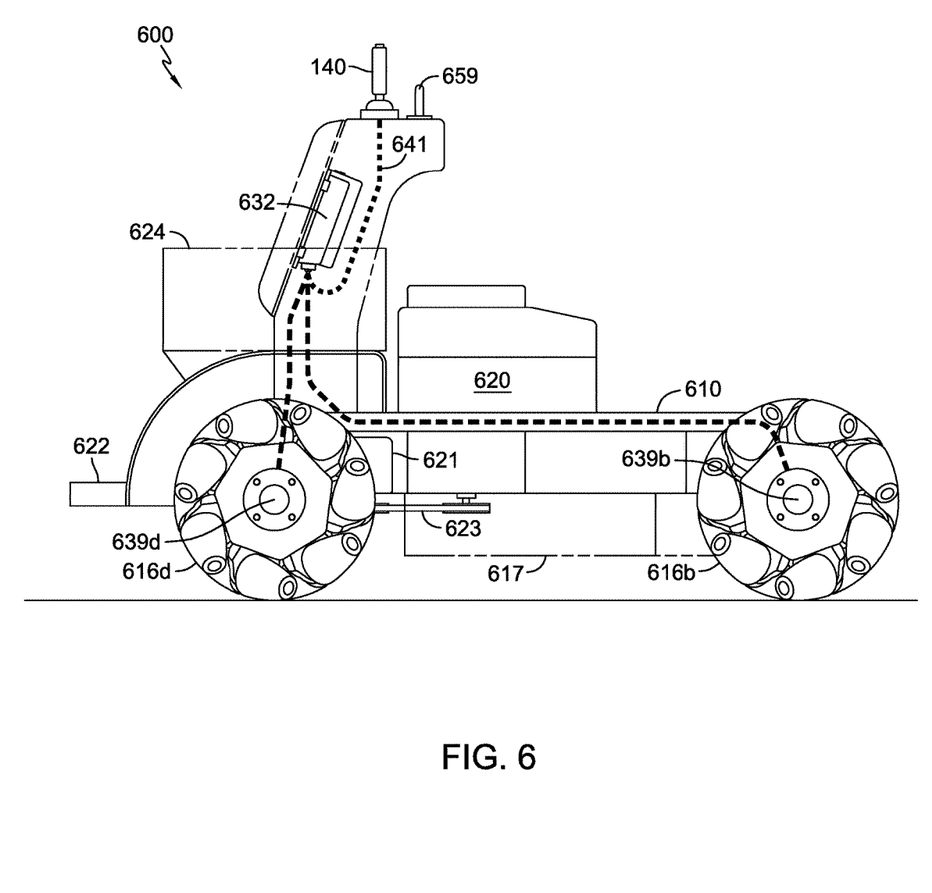
FIG. 6 is a side elevational view of a sixth exemplary vehicle incorporating the control system as disclosed herein.

FIG. 6 depicts an exemplary hybrid stand-on zero turn vehicle 600 that is similar to vehicle 500, but differing in the placement of platform 622 and prime mover 620. Platform 622 is disposed at the rear of vehicle 600 and prime mover 620 is mounted forward of platform 622 upon frame 610. FIG. 6 depicts one side of vehicle 600, but it will be understood that the opposite side is substantially identical thereto. Electric wheel hub motors 639b, 639d are shown upon which Mecanum wheels 616b, 616d are mounted, respectively. Joystick 140 is connected to controller 632 through conductor 641, and controller 632 is connected to each of the wheel hub motors 639b, 639d. Stationary handle 659 is disposed near joystick 140, and can be grasped to provide stability to the operator when operating vehicle 600.

Figure 7:
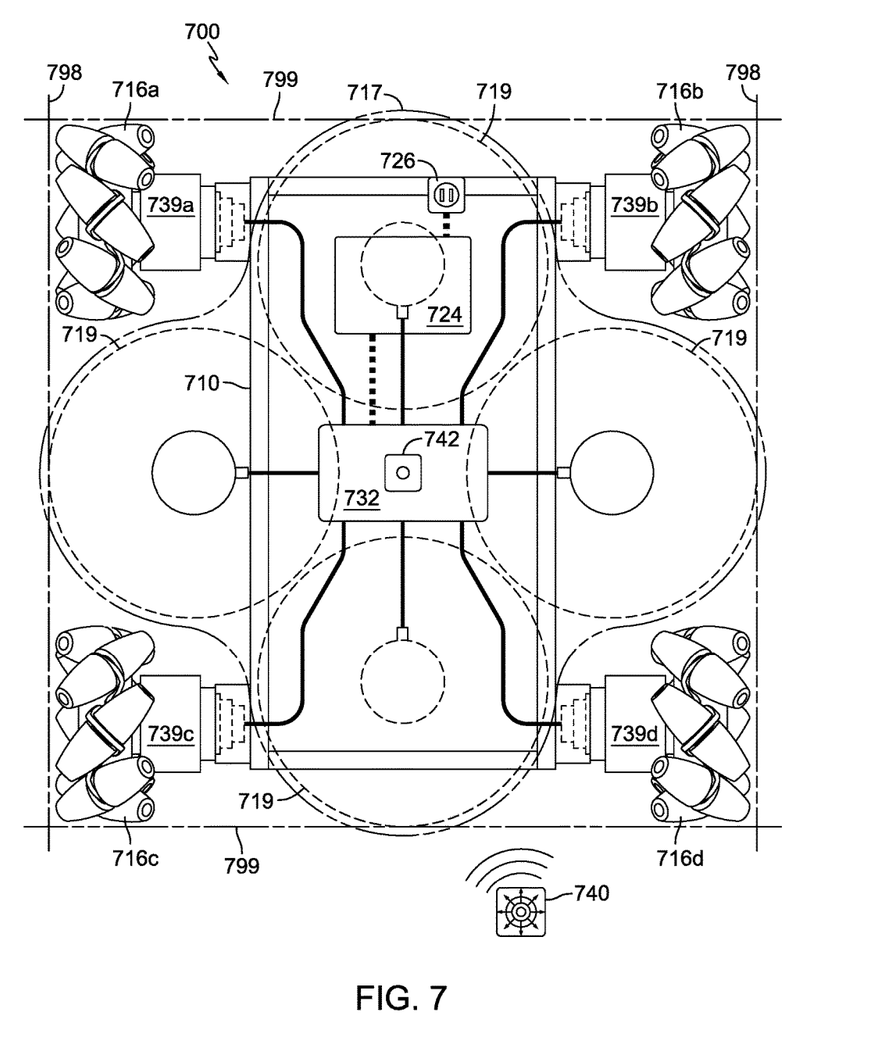
FIG. 7 is a top plan view of a seventh exemplary vehicle incorporating the control system as disclosed herein.

FIG. 7 depicts an exemplary all-electric remotely-controlled zero turn vehicle 700. Mecanum wheels 716a-d are mounted on electric wheel hub motors 739a-d, respectively. Each wheel hub motor 739a-d is connected to controller 732. Joystick 740 is wirelessly in communication with controller 732 via receiver 742 so that vehicle 700 can be remotely controlled by an operator. A wireless transmitter (not shown) may be included in joystick 740 to allow wireless communication with receiver 742 on vehicle 700. This figure depicts the additional flexibility of the design, as the lack of an operator seat or platform in vehicle 700 allows additional space for other components, such as four blades 719. The longitudinal and lateral cutting paths 798, 799, respectively, of blades 719 extend beyond the Mecanum wheels 716a-d to increase the size of the cutting area when vehicle 700 is moving in the forward, reverse, or lateral directions.

It will be understood that the depiction of the batteries 124, 224, 324, 424, 524, 624, and 724 in FIGS. 1-7 is representational, and that in each vehicle one or more batteries may be used. For example, in FIG. 4, battery 424 could be four 12-volt batteries with multiple alternators 421 charging each of the batteries or pairs of the batteries.

Figure 8:
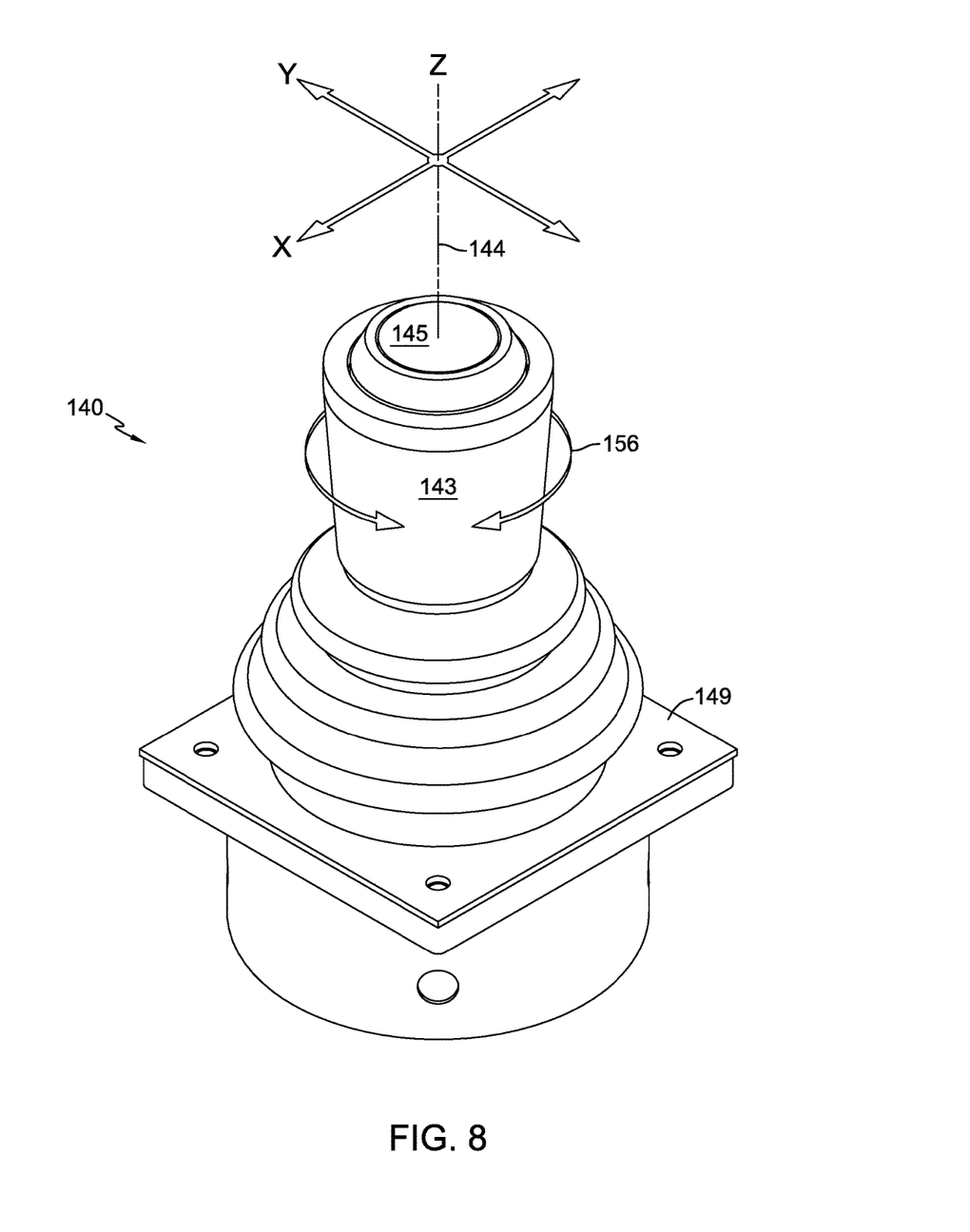
FIG. 8 is a perspective view of a joystick-style input device for use with the vehicles and systems disclosed herein.

Joystick 140, which is depicted as being the same in each of the vehicle embodiments, is shown in more detail in FIG. 8, and can be similar in many respects to a standard joystick. It comprises a base 149 to connect to the vehicle in a known manner. Stick 143 pivots about its base 149 in all directions as a standard joystick, as indicated by the X and Y axes in FIG. 8. As shown by arrows 156, stick 143 also rotates about a vertical axis 144 (i.e., the Z axis), to provide 360° of vehicle rotation.

Pushbutton 145 may be used as a switch to provide additional functionality. For example, the programming of the controller, such as controller 432 shown in FIG. 4, could allow pushbutton 145 to activate an auxiliary function or device of vehicle 400, such as mowing deck 417, for example. Alternatively, the programming of controller 432 could conditionally allow activation of an auxiliary function or device, such as mowing deck 417, dependent upon the position of joystick 140 and/or may disable an auxiliary function or device, such as mowing deck 417, dependent upon the position of joystick 140. For example, if the joystick 140 is positioned to drive the vehicle 400 in reverse or effect a reverse turn, the mowing deck 417 would be deactivated and/or not be permitted to actuate. Furthermore, through programming of controller 432, a combination of vehicle 400 conditions, including the position of joystick 140, could be used to allow activation or to disable an auxiliary function or device. An operator could also use pushbutton 145 as a selector switch to alternate between different programming schemes (as described herein below) that modify and/or limit control over the vehicle, such as switching between steering response modes, for example. These programming schemes may include, e.g., a conventional steering mode, crabbing mode and a zero turn mode. In certain vehicles, the function of pushbutton 145 may be that of switching between a first vehicle speed range and a second vehicle speed range which, in the case of a mowing vehicle, may be dependent upon engagement or disengagement of mowing deck blades.

FIGS. 9-16 are representational figures depicting various possibilities for operating the vehicles depicted herein. FIGS. 9, 11, 13 and 15 are similar depictions of sixteen possible positions 1 through 16 of joystick 140; it will be understood that joystick 140 is infinitely variable, so these specific positions are merely representative of selected positions for purposes of understanding the different programming options available with this system. The following disclosure references vehicle 300 of FIG. 3 and the elements thereof merely for convenience of description, as it would also apply to the other vehicles disclosed herein and other embodiments.

Figure 9:
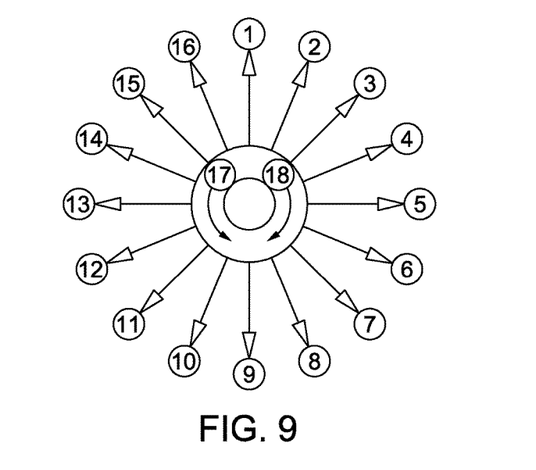
FIG. 9 is a representation of certain possible drive positions of the joystick of the present invention, using a first set of instructions for controlling and modulating the vehicle output.
Figure 10:
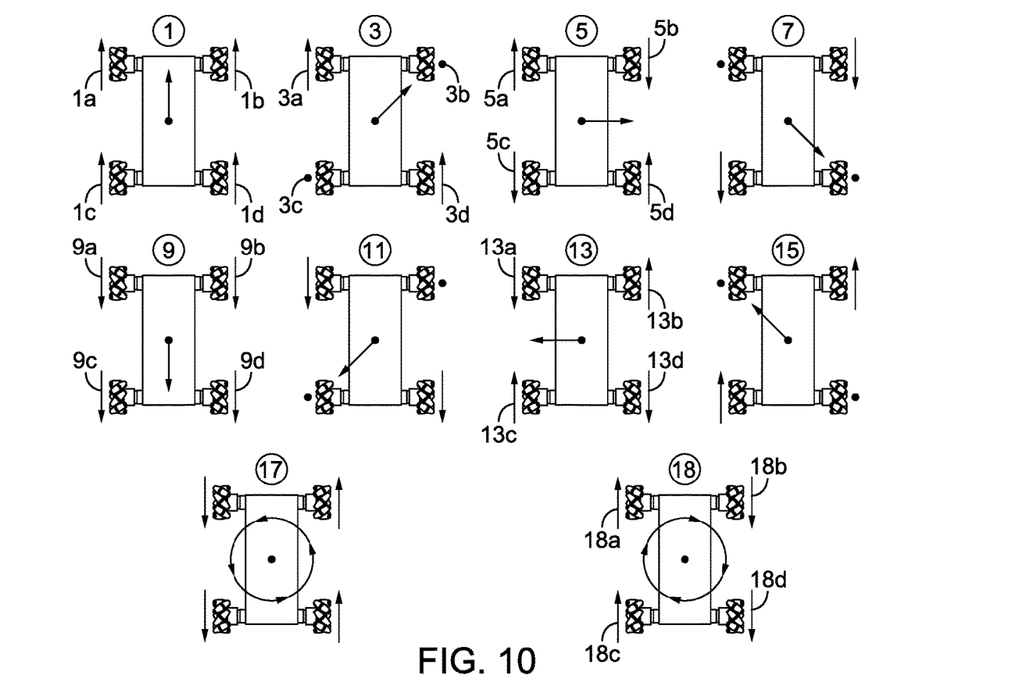
FIG. 10 is a representation of the vehicle movements corresponding to certain positions of the joystick depicted in FIG. 9.

FIG. 9 depicts possible positions of joystick 140 and FIG. 10 depicts the movements of vehicle 300 and Mecanum wheels 316a-d in response to the positions of joystick 140. FIG. 10 primarily depicts (for joystick positions 1, 3, 5, 7, 9, 11, 13, and 15) a crabbing mode of travel for vehicle 300, wherein vehicle 300 can move forward, backward, sideways, diagonally or obliquely along any two-dimensional vector without turning vehicle 300. In addition, joystick 140 includes a twist component (i.e., joystick positions 17 and 18), which permits an operator to enter zero turn by rotating or twisting the stick 143 about its vertical axis 144. In FIG. 10, the arrows shown next to each Mecanum wheel 316a-d depict the relative speeds of each of the Mecanum wheels 316a-d of vehicle 300, and the arrow shown in the center of vehicle 300 depicts the resulting direction of movement of vehicle 300.

Position 1 depicts all Mecanum wheels 316a-d driven forward at full speed, so arrows 1a-d are of equal length and vehicle 300 is operating in the forward direction at full speed. Similarly, position 9 depicts all Mecanum wheels 316a-d driven in reverse at full speed, so arrows 9a-d are of equal length and vehicle 300 is operating in the reverse direction at full speed.

Position 3 shows Mecanum wheels 316a, 316d driven at full speed forward, as shown by arrows 3a, 3d, respectively, while Mecanum wheels 316b, 316c are stopped, as shown by the dots at 3b, 3c in FIG. 10. This represents a diagonal movement of the vehicle 300 in the forward right direction. As joystick 140 is pivoted further to the right, it will reach position 5 where Mecanum wheels 316a, 316d are driven in the forward direction, as shown by arrows 5a, 5d, and Mecanum wheels 316b, 316c are driven at the same speed but in the opposite direction, as shown by arrows 5b, 5c. This results in a lateral movement of the vehicle 300 to the right.

It will be understood that operation of joystick 140 in positions 6-16 will move vehicle 300 in the same manner, but in different directions. Mecanum wheels 316a-d will be driven suitably when joystick 140 is operated to move vehicle 300 in the desired direction. For example, moving joystick 140 from position 1 to 16 to 15 to 14 will result in a diagonal movement of vehicle 300 in different degrees of the forward left direction. At position 13, vehicle 300 will move laterally to the left. In particular, Mecanum wheels 316a, 316d are driven in the reverse direction, as shown by arrows 13a, 13d, and Mecanum wheels 316b, 316c are driven in the forward direction, as shown by arrows 13b, 13c. As joystick 140 continues to move from position 13 to position 9, vehicle 300 will leave the lateral left mode of position 13 and move in different degrees of the reverse left direction until it reaches position 9, and vehicle 300 will begin backing straight. It will be understood that as the joystick moves from the zero-zero position out to each position 1 through 16 along the vectors shown in FIG. 9, the speeds of the rotating wheels will vary depending on the displacement of the joystick from the zero-zero position, but will remain at a relative difference with respect to one another (or at no relative difference, e.g., at positions 1 and 9).

The twist component of joystick 140 is shown by arrows/positions 17 and 18 in FIG. 9. In particular, rotation of joystick 140 in the clockwise direction, denoted by arrow/position 18, results in vehicle 300 making a zero turn in the clockwise direction. Left side Mecanum wheels 316a, 316c are driven in the forward direction, as shown by arrows 18a, 18c, and right side Mecanum wheels 316b, 316d are driven in the reverse direction, as shown by arrows 18b, 18d. Similarly, rotation of joystick 140 in the counterclockwise direction, denoted by arrow/position 17, results in vehicle 300 making a zero turn in the counterclockwise direction. In this case, Mecanum wheels 316a-d are driven opposite to when vehicle 300 is making a zero turn in the clockwise direction. The degree of twist applied to stick 143 by the vehicle operator determines the speed of the zero turn.

Figure 11:
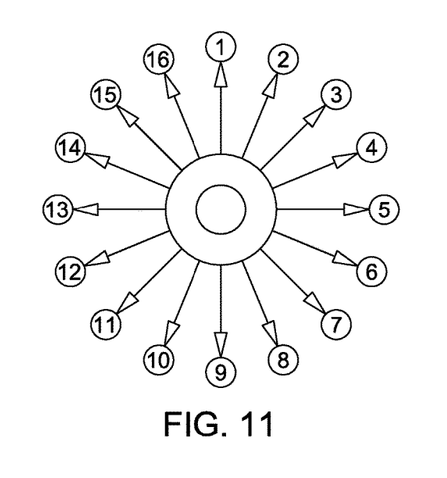
FIG. 11 is a representation of certain possible drive positions of the joystick of the present invention, using a second set of instructions for controlling and modulating the vehicle output.
Figure 12:
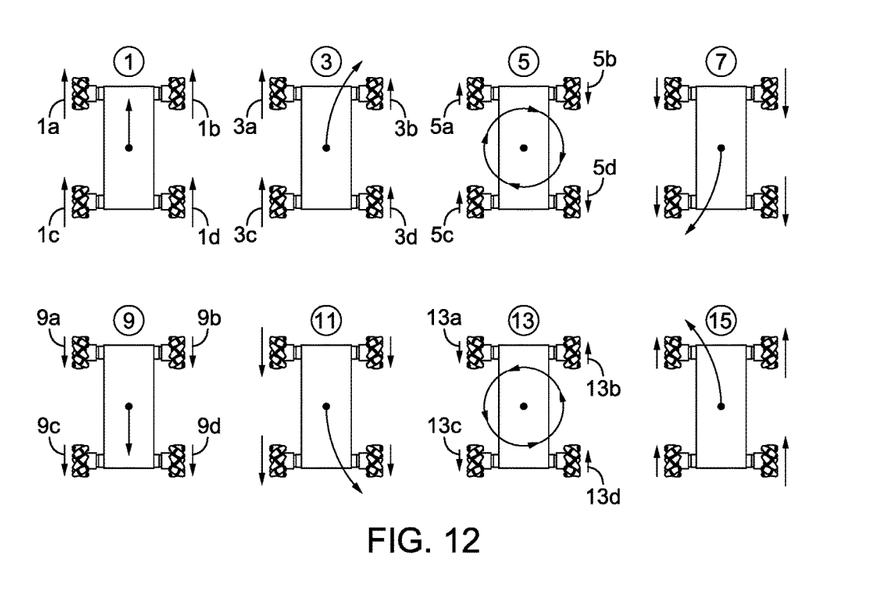
FIG. 12 is a representation of the vehicle movements corresponding to certain positions of the joystick depicted in FIG. 11.

FIGS. 11 and 12 are similar to those above, but depict the motion of vehicle 300 using a joystick 140 without the twist component described for FIGS. 9 and 10, and with a speed control function added to controller 332M. FIG. 12 depicts a turning mode of vehicle 300 which is more conventional than the crabbing mode described previously. In this mode, vehicle 300 turns in variable radius arcs rather than moving along oblique vectors. In this embodiment, zero turn operation of vehicle 300 is performed by moving joystick 140 to position 5 or 13 to make a zero turn in the clockwise or counterclockwise direction, respectively. The shorter arrows 5a-d and 13a-d in FIG. 12 for positions 5 and 13 show that controller 332M limits the speed of Mecanum wheels 316a-d during zero turn operations. This limitation can be particularly important for safety and ease of operation, such as to prevent vehicle 300 from being thrown into a full speed zero turn operation at high speed.

In FIG. 12, the arrows 9a-d for position 9 (reverse direction of vehicle 300) are shorter than arrows 1a-d for position 1 (forward direction of vehicle 300), which demonstrates a speed limit on full reverse speed. Positions 3, 7, 11, and 15 shown in FIG. 12 depict a speed differential between Mecanum wheels 116a, 116c and 116b, 116d located on opposite sides of vehicle 300, resulting in arcuate turns. For example, position 3 shows all Mecanum wheels 316a-d being driven in a forward direction, with Mecanum wheels 316a, 316c driven at full speed forward, as shown by arrows 3a, 3c, and Mecanum wheels 316b, 316d driven at a reduced speed forward, as shown by shorter arrows 3b, 3d. This results in a gradual right turn of vehicle 300. Operation of joystick 140 at other positions will move vehicle 300 in the same manner, but in different directions. Moving joystick 140 from position 1 to 2 to 3 to 4 to 5 will result in a right turn of vehicle 300 that becomes gradually sharper and slower until vehicle 300 is performing a reduced speed clockwise zero turn.

Figure 13:
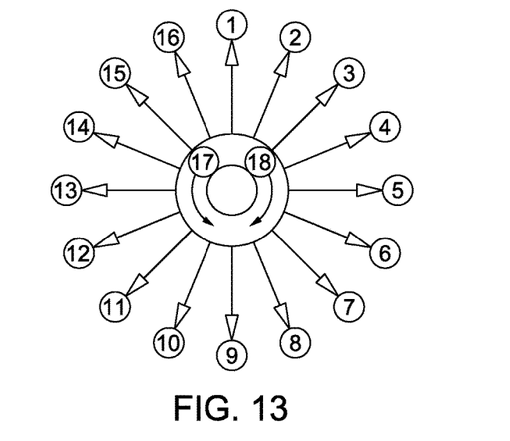
FIG. 13 is a representation of certain possible drive positions of the joystick of the present invention, using a third set of instructions for controlling and modulating the vehicle output.
Figure 14:
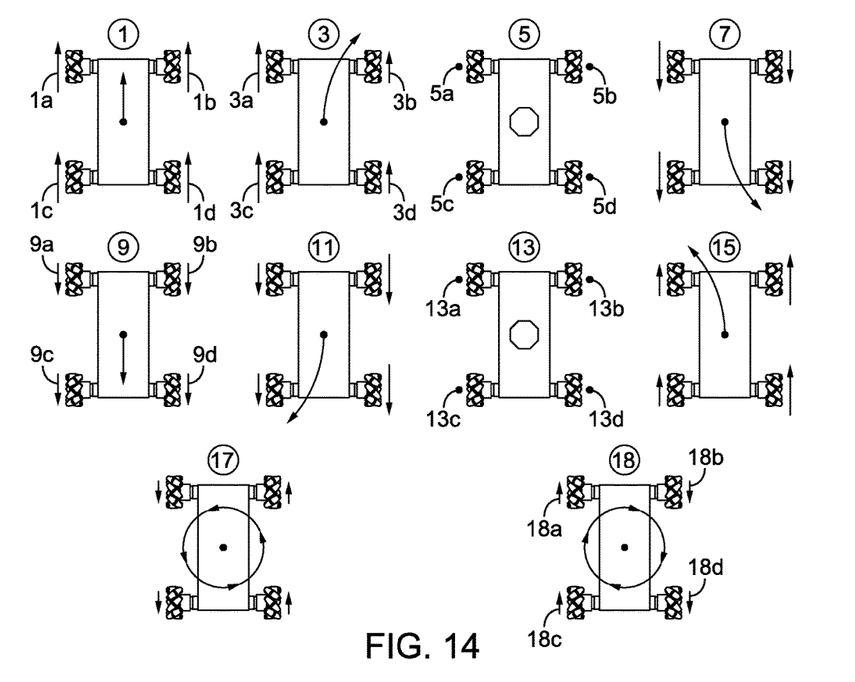
FIG. 14 is a representation of the vehicle movements corresponding to certain positions of the joystick depicted in FIG. 13.

FIGS. 13 and 14 are similar to the drawings above, but represent a different set of programming for controller 332M. In this embodiment, a speed control function is included in controller 332M and joystick 140 includes a twist component similar to that described above for performing zero turn operations of vehicle 300. Controller 332 is also programmed such that movement of joystick 140 to full right or left, i.e., positions 5 or 13, results in vehicle 300 stopping, instead of moving sideways or performing a zero turn, as in the previously-described embodiments. When joystick 140 is in positions 5 and 13, all Mecanum wheels 316a-d are stopped. This stop function prevents problematic vehicle operation when approaching joystick position 5 from either a sharp forward turn to the right (i.e., position 4) or a sharp reverse turn to the right (i.e., position 6). The absence of a stop would result in an immediate counter rotation of vehicle 300 when transitioning between these sharp forward and reverse turns. Note that this issue is resolved in a different manner in the programming depicted in FIG. 12, where the direction of the vehicle's reverse turn is opposite the positional movement of joystick 140 (i.e. joystick position 7 results in a backward turn to the left). This creates an easy transition in and out of the clockwise zero turn programmed at position 5, but creates a somewhat counterintuitive reverse turn mode for the vehicle operator.

Zero turn operations of vehicle 300 in this embodiment are performed by twisting joystick 140, similar to the embodiment of FIGS. 9 and 10. In addition, zero turn operations in this embodiment are speed limited, similar to the embodiment of FIGS. 11 and 12, as shown by the shorter arrows 18a-d for Mecanum wheels 316a-d, for example. Turns of vehicle 300 are also speed limited in this embodiment, similar to the embodiment of FIGS. 11 and 12. In particular, moving joystick 140 from position 1 to 2 to 3 to 4 to 5 will result in a right turn of vehicle 300 that becomes gradually sharper and slower until vehicle 300 stops (when joystick 140 is at position 5).

A potential drawback of the above embodiment is that a user driving vehicle 300 in a tight left or right turn, such as one mowing a tight circle around an object, could inadvertently move the joystick 140 to the stopped positions 5 or 13. This would cause aggravation and delay in completing the job. To address this concern, the programming of controller 332M can be modified along with a physical modification of joystick 140. In particular, physical stops can be included in or adjacent to joystick 140 to restrict the movement of joystick 140 and prevent it from moving into a stopped position from either the forward or reverse directions. This permits vehicle 300 to have a minimum turning radius determined by the vehicle parameters, so that the operator can fully pivot the joystick 140 in the desired direction without concern that the vehicle will hit the stopped position.

Figure 15:
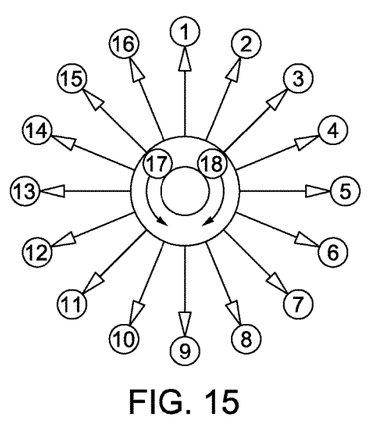
FIG. 15 is a representation of certain possible drive positions of the joystick of the present invention, using a fourth set of instructions for controlling and modulating the vehicle output.
Figure 16:
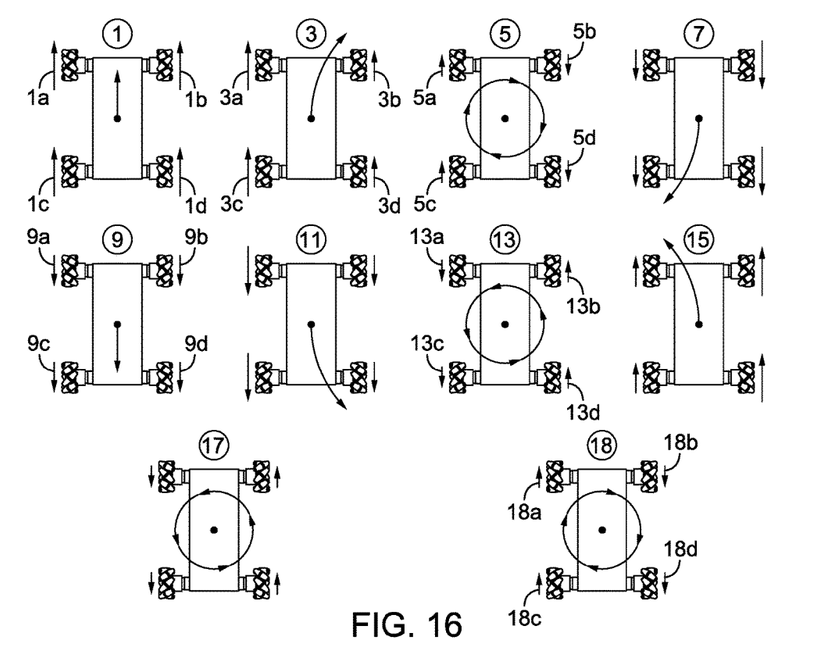
FIG. 16 is a representation of the vehicle movements corresponding to the positions of the joystick depicted in FIG. 15.

FIGS. 15 and 16 depict a system that allows zero turn operations of vehicle 300 to be performed by pivoting joystick 140 as depicted in FIG. 12 or by twisting joystick 140 as depicted in FIG. 14. In particular, a zero turn in the clockwise direction may be accomplished by moving joystick 140 to position 5 or by twisting joystick 140 in the clockwise direction as denoted by position 18. Conversely, a zero turn in the counterclockwise direction may be accomplished by moving joystick 140 to position 13 or by twisting joystick 140 in the counterclockwise direction as denoted by position 17. Similar to certain previously-described embodiments, this embodiment includes programming controller 332M with a speed control function. In particular, moving joystick 140 from position 1 to 2 to 3 to 4 to 5 will result in a right turn of vehicle 300 that becomes gradually sharper and slower until vehicle 300 is performing a reduced speed clockwise zero turn. Joystick twist-to-zero-turn operations indicated by positions 17 and 18 of joystick 140 in this embodiment are also speed limited as indicated by the relatively short arrows 18a-18d. As noted above, for all embodiments, the references to controller 332M and vehicle 300 are exemplary only, as this invention can be used with the other vehicles depicted herein and other utility vehicles where this type of zero turn operation and control is desirable.

The "twist" feature of joystick 140 could also be used in different manners in addition to the twist-to-zero-turn embodiments previously described, and various modifications may be programmed into the controller. For example, the twist capability depicted in FIGS. 9, 13, and 15 as positions 17 and 18 corresponding to zero turn for the vehicle could be limited to situations where stick 143 is in the zero-zero position on the X-Y axes of FIG. 8, and the controller could be programmed such that rotation of stick 143 about its Z axis could have different effects, or no effect at all, when stick 143 is not in this zero-zero position. By way of example, for safety reasons one may wish to program the controller such that a twisting of stick 143 about its Z axis would have no effect if the joystick 140 is in one of the positions 1 through 16. Alternatively, the controller could be programmed to permit different responses if the joystick 140 is in one of these positions. For example, if joystick 140 is in position 1, which corresponds to the full ahead position and both wheels are being rotated at the same speed, a twist in one direction would subtract rotational speed from one of the two drive units to permit steering. This would be similar to moving the joystick 140 to, for example, positions 2 or 16, but the twist feature may afford the operator a more refined steering sense and control over the vehicle direction.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A highly maneuverable mowing vehicle, comprising:
  a set of four variable drive units mounted on a frame, wherein each variable drive unit has an output axle;
  a set of four Mecanum wheels, each mounted to the output axle of one of the set of four variable drive units, wherein a front pair of the set of four Mecanum wheels is spaced apart from each other at a first distance and a rear pair of the set of four Mecanum wheels is spaced apart from each other at the first distance;
  a mowing deck mounted to the frame, wherein the mowing deck comprises a plurality of mowing blades and the plurality of mowing blades form a plurality of cutting paths, and each of the plurality of cutting paths extends beyond an outermost edge of at least two of the set of four Mecanum wheels; and
  a control system for independently controlling an output of each variable drive units, the control system comprising:
    a controller mounted to the frame and having a processor and program storage comprising a plurality of operational programs; and
    a joystick for directional control inputs in communication with the controller;
  wherein the plurality of operational programs are configured to permit the vehicle to alternatively operate in a conventional steering mode, a crabbing mode, and in a zero turn mode.

2. The vehicle of claim 1, wherein the plurality of mowing blades consists of a set of four mowing blades and the plurality of cutting paths consists of a first longitudinal cutting path extending beyond a first outermost edge of two of the set of four Mecanum wheels on a first side of the vehicle and a second longitudinal cutting path extending beyond a second outermost edge of two of the set of four Mecanum wheels on a second side of the vehicle, a first lateral cutting path extending beyond a third outermost edge of the front pair of the set of four Mecanum wheels and a second lateral cutting path extending beyond a fourth outermost edge of the rear pair of the set of four Mecanum wheels.

3. The vehicle of claim 2, wherein the mowing deck comprises a set of four electric motors in communication with the controller and each electric motor respectively driving one of the mowing blades.

4. The vehicle of claim 1, wherein each variable drive unit comprises an electric wheel hub motor in communication with the controller.

5. The vehicle of claim 1, further comprising a selector switch to permit an operator to select between the plurality of operational programs.

6. The vehicle of claim 5, wherein the selector switch is disposed on the joystick.

7. The vehicle of claim 2, wherein the control system further comprises a receiver mounted to the frame, and the joystick is in wireless communication with the controller via the receiver.

8. The vehicle of claim 2, further comprising a charge receptacle mounted to the frame and in electrical communication with a battery.

9. A vehicle, comprising:
a power source disposed on a frame;
a set of four variable drive units mounted on the frame and powered by the power source, wherein each variable drive unit drives an output axle;
a set of four Mecanum wheels, each Mecanum wheel being mounted to the output axle of one of the set of four variable drive units, wherein a front pair of the set of four Mecanum wheels is spaced apart from each other at a first distance and a rear pair of the set of four Mecanum wheels is spaced apart from each other at the first distance;
a platform fixed to the frame for an operator of the vehicle to stand upon;
a mowing deck mounted to the frame, the mowing deck comprising a first cutting blade having a first cutting area and a second cutting blade having a second cutting area, wherein the first cutting area extends beyond a first outermost edge of a first pair of the set of four Mecanum wheels on a first side of the vehicle, and the second cutting area extends beyond a second outermost edge of a second pair of the set of four Mecanum wheels on a second side of the vehicle; and
a control system mounted to the frame for independently controlling an output of each variable drive unit, the control system comprising:
a controller having a processor and program storage comprising a plurality of operational programs; and
a joystick for directional control inputs in communication with the controller;
wherein the plurality of operational programs are configured to permit the vehicle to alternatively operate in a conventional steering mode, a crabbing mode, and in a zero turn mode.

10. The vehicle of claim 9, wherein the mowing deck comprises at least one electric motor driving the first cutting blade and the second cutting blade, and the at least one electric motor is in communication with the controller.

11. The vehicle of claim 9, wherein each variable drive unit comprises an electric wheel hub motor in communication with the controller.

12. The vehicle of claim 9, further comprising a selector switch to permit the operator to select between the plurality of operational programs.

13. The vehicle of claim 12, wherein the selector switch is disposed on the joystick.

14. The vehicle of claim 9, wherein the platform extends beyond the rear pair of the set of four Mecanum wheels.

15. A vehicle, comprising:
a power source disposed on a frame;
a set of four variable drive units mounted on the frame and powered by the power source, wherein each variable drive unit has an output axle;
a set of four Mecanum wheels, each mounted to the output axle of one of the set of four variable drive units, wherein a front pair of the set of four Mecanum wheels is spaced apart from each other at a first distance and a rear pair of the set of four Mecanum wheels is spaced apart from each other at the first distance;
a mowing deck mounted to the frame, the mowing deck comprising a first mowing blade disposed adjacent a first side of the vehicle and having a first cutting area extending beyond a first outermost edge of a first side pair of the set of four Mecanum wheels, and a second cutting blade disposed adjacent a second side of the vehicle and having a second cutting area extending beyond a second outermost edge of a second side pair of the set of four Mecanum wheels.

16. The vehicle of claim 15, further comprising a third mowing blade disposed adjacent a front of the vehicle and having a third cutting area extending beyond a third outermost edge of the front pair of the set of four Mecanum wheels, and a fourth mowing blade disposed adjacent a rear of the vehicle and having a fourth cutting area extending beyond a fourth outermost edge of the rear pair of the set of four Mecanum wheels.

17. The vehicle of claim 16, further comprising a control system mounted to the frame for independently controlling an output of each variable drive unit, the control system comprising a controller having a processor and program storage comprising a plurality of operational programs, and a joystick for directional control inputs in communication with the controller, wherein the plurality of operational programs are configured to permit the vehicle to alternatively operate in a conventional steering mode, a crabbing mode, and in a zero turn mode.

18. The vehicle of claim 17, further comprising a selector switch to permit an operator to select between the plurality of operational programs.

19. The vehicle of claim 17, further comprising a receiver in communication with the controller, wherein the joystick is in wireless communication with the controller via the receiver.

20. The vehicle of claim 17, wherein the plurality of operational programs are further configured to permit the vehicle to operate in a first vehicle speed range or in a second vehicle speed range.

* * * * *